June 21, 1938.    A. B. BAILEY    2,120,971
SYSTEM AND METHOD OF DETERMINING DISTANCE
Filed Dec. 21, 1935    3 Sheets-Sheet 1

INVENTOR
A. B. BAILEY
BY
J. W. Schmied
ATTORNEY

Patented June 21, 1938

2,120,971

UNITED STATES PATENT OFFICE 2,120,971

SYSTEM AND METHOD OF DETERMINING DISTANCE

Arnold B. Bailey, New York, N. Y., assignor to Bell Telephone Laboratories, Incorporated, New York, N. Y., a corporation of New York Application December 21, 1935, Serial No. 55,569

15 Claims. (Cl. 177—352)

This invention relates to the determination of distance by means of longitudinal waves and more particularly to a means and method of establishing the altitude of an airplane in flight.

An object of this invention is to ascertain distance.

A more particular object of this invention is to obtain an indication in an airplane of the distance of the airplane above ground.

In the last decade and a half, air transportation has made remarkable strides. From a few lines covering short distances in the United States a relatively few years ago, commercial transcontinental air routes now span the country from New York to Los Angeles and from New Orleans to Chicago. Remarkable as this progress has been, the potentiality and future utilization of the airplane in transportation is stupendous. One most important factor responsible for the advance in air transportation in recent years is the development of sundry means for rendering air transportation less hazardous. While at present the hazard of transportation by air is considerably less than that of a few years ago, airplane disasters occur far too frequently. The landing of an airplane in foggy weather or when visibility is poor is perhaps one of the greatest contributory causes of airplane disasters. For safe landing when blind flying, a quick, accurate indication of the height of an airplane above ground, particularly at low altitudes, is highly essential.

In accordance with this invention, an indication of the height of an airplane above ground is obtained by means of transmission and reception after reflection of a sonic or supersonic wave. A supersonic or sonic wave is transmitted at predetermined intervals. The wave, after reflection from the ground, indicates by means of one or several of a plurality of gaseous discharge devices the height of the airplane above ground.

In a specific embodiment, a pulse of current employed to emit the wave also charges a condenser. The wave after reflection from the ground and reception at the source, discharges the condenser. The electromotive force resulting from the discharge of the condenser is impressed and thereby ignites one of a plurality of gaseous space discharge devices. The particular device ignited is dependent upon the period of time between the charging and discharging of the condenser. Since this time is directly correlated with the distance over which the wave travels from the source to the ground or other reflecting surface and returns to the source, the illumination of one of the plurality of devices indicates the particular height of the airplane or other mobile object above the reflecting surface. Alternately, the pulse employed to transmit the wave causes a condenser to commence to charge so that the potential built up across the condenser increases with time. The wave after reflection actuates the discharge of the condenser through a plurality of gaseous space discharge devices. The gaseous space discharge devices are biased so that they flash at varying magnitudes of the electromotive force resulting from the discharge of the condenser. Since the magnitude varies with the charging time or the interval required for the wave to travel to ground and return, the number of devices ignited indicates the distance.

A more comprehensive understanding of this invention is obtained by reference to the accompanying drawings in which:

Fig. 1 is a schematic diagram of this invention in which distance is indicated by the illumination of one of a plurality of discharge devices;

Fig. 2 shows an embodiment of this invention in which altitude is ascertained by the illumination of one or more of a plurality of discharge devices;

Figs. 1A and 2A show the indicating devices employed in the system shown in Figs. 1 and 2, respectively, while

Figures 1, 1A:
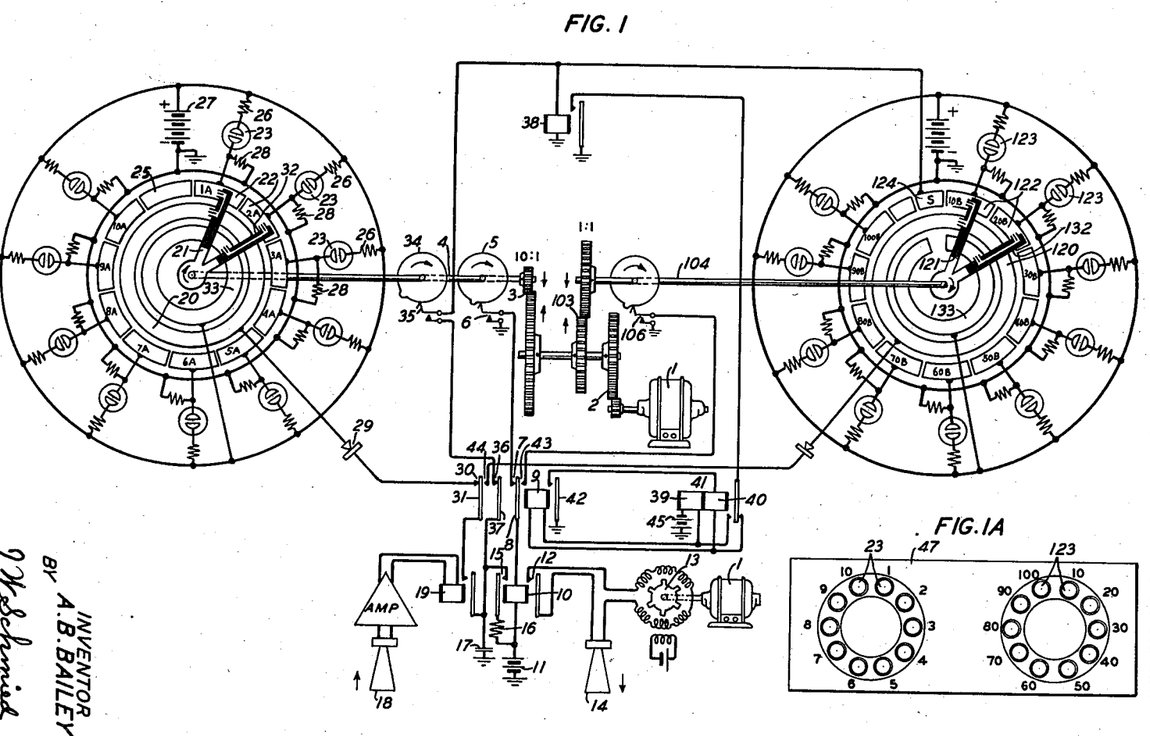

In the system shown in Fig. 1, a particular altitude or distance is indicated by the illumination of one of a plurality of discharge devices. The system is capable of indicating a particular distance within two ranges of distances. A motor 1 rotates a shaft 4 at a uniform speed by means of sets of gears 2 and 3. Fixedly attached to the shaft 4 is a cam 5 with an elevation on the periphery thereof. The elevation on the periphery of the wheel 5 controls a pair of contacts 6 to energize a relay 10 through a contact 7 and an armature 8 of a relay 9 from a source of current 11. The engagement of a contact and armature 12 of the relay 10 results in the keying of the output of an inductor-alternator 13 to transmit a sonic or supersonic wave or train of waves from a transmitter 14. The inductor-alternator 13 is of the type described in an article entitled, "Inductor-alternators for Signaling Purposes" by F. W. Merrill in Electrical Engineering, January 1934, Vol. 53, No. 1, pages 78 to 86 and is preferably capable of producing oscillations of 1000 cycles. Any other type of oscillator, however, may be employed instead of the inductor-alternator 13. The transmitter 14 is preferably of the directional type and is located for the determination of altitude on the underside of an airplane. The elevation on the periphery of the wheel 5 is constructed so that for a brief interval once during each revolution of the shaft 4, the contact 6 engages to transmit a wave or train of waves from the transmitter 14. The energization of relay 10 also results in the momentary charging of a condenser 17 from the source of current 11 through a resistance 16 and an armature and make contact 15 of relay 10. After the wave or train of waves is transmitted from the transmitter 14 it is reflected upon the terrain or sea bottom and is impressed upon a microphone 18 located in close proximity to the transmitter 14. If the system is employed on an airplane, the microphone is located on the underside of the airplane in close proximity of the transmitter 14. The impressed waves are amplified by an amplifier to energize a relay 19. The amplifier is indicated by a labeled block diagram in the drawings.

Fixedly attached to the shaft 4 is a brush 21. The brush is in engageable relation with a slip ring 20 and a plurality of commutator segments 22 to connect the slip ring with one of the plurality of segments 22. Each of the commutator segments 22, numbered consecutively 1A to 10A, is of equal arcuate length. The brush 21 always engages one of the commutator segments 22 except when in contact with a dead segment 25. The brush 21 is in contact with the dead segment 25 when the elevation on the periphery of the cam 5 causes the engagement of the contacts 6. Accordingly, the condenser 17 which is charged simultaneously with the engagement of the contacts 6 is not discharged.

Each of the plurality of commutator segments 22 is connected to one electrode of a separate dielectrode luminous discharge device filled with neon gas. The other electrode of each device 23 is connected through a protective resistance 26 to one terminal of a source of current 27. The other terminal of the source 27 is at ground potential. The electrode of each device 23 connected to its respectively associated segment is connected through a resistance 28 to ground. The slip ring 20 is connected to the make contact of relay 19 through a copper oxide rectifier 29 and a break contact 30 and armature 31 of relay 9. The armature of relay 19 is connected to one plate of the condenser 17, the other plate of condenser 17 being connected to ground. When a wave or train of waves after reflection on the terrain is impressed upon the microphone 18 the rectified current in the output of the amplifier energizes relay 19 to complete a circuit by the engagement of its armature and make contact from ground through condenser 17, the armature and make contact of relay 19, armature 31, contact 30, copper oxide rectifier 29, slip ring 20, brush 21, one of the plurality of segments 22, the respectively associated illuminating device 23 of the segment 22 with which the brush is in contact, resistance 26, source 27 to ground. The condenser 17 is accordingly discharged and its potential applied to the particular illuminating device associated with the segment 22 upon which the brush 21 is at that time engaged. The characteristic of illuminating devices 23 is such and the value of the source 27 is selected so that under static conditions with no transient voltage across the resistance 28 the device 23 does not discharge. When the surge resulting from the discharge of the condenser 17 is impressed upon a particular device 23, however, the potential across the device increases above its critical discharge value and the device becomes illuminated. When the surge ceases, the device 23 continues to be illuminated since the circuit values are selected so that it maintains the discharge with a lower potential than that which is necessary for initial discharge. The circuit for maintaining the discharge after the initial ignition of the device 23 is from ground, resistance 28, device 23, resistance 26, source 27 to ground.

A scavenger brush 32 fixedly attached to the shaft 4 is in engageable relation with the plurality of commutator segments 22 and is separated from the brush 21 the arcuate length of one segment 22. The brush 32 is also in contact with a slip ring 33 connected to one electrode of each of the plurality of illuminating devices 23 through their respectively associated resistance 26. The brush 32 is fixedly attached to the shaft 4 so that it precedes the brush 21 in the rotation of the shaft 4 by the arcuate length of one commutator segment. Accordingly, when the scavenger brush 32 is in contact with one segment 22, brush 21 is in contact with the segment which the brush 32 had just previously engaged. When the brush 32 makes contact with a commutator segment 22 the electrodes of the illuminating device 23 with which the segment is associated, are connected to each other through resistance 26 to shunt the source 27. The shunting of the source 27 results in the de-ignition of the device 23.

The above-described system indicates a particular distance within a predetermined range. A longitudinal wave or train of waves is transmitted by the transmitter 14 as a result of the engagement of contacts 6 once during each revolution of the shaft 4. Simultaneously with the transmission of the train of waves, the condenser 17 is charged from the source 11. The condenser is discharged through the particular segment 22 with which the brush 21 is in contact when the reflected wave or train of waves is impressed upon the microphone 18. The device 23 corresponding to the particular segment is illuminated. Since the brush 21 is rotated at a constant speed and all of the segments 22 are of equal arcuate length, the particular device illuminated indicates the time elapsing between transmission of the wave and the reception of the reflected wave or the distance between the system and reflecting surface. In this manner the altitude or depth is indicated by the illumination of a particular device.

The limit of distance which may be ascertained, however, cannot of necessity exceed the distance traversed by the train of waves in the molecular medium through which the waves pass to a reflecting surface and return to the transmitter in the time required for the shaft 4 to revolve one complete revolution. Frequently, as in an airplane, the pilot requires knowledge of the exact number of feet when the plane is less than ten feet above the terrain, while for distances from 10 to 100 feet the approximate altitude is all that is desired. For determining the altitude from one to ten feet the shaft 4 is rotated by gear 3 so that each of the illuminating devices 23 indicates the altitude in units of one foot for an altitude of from one to ten feet. The segments 22 are numbered 1A to 10A to indicate the number of feet indicated by the devices 23 associated with these segments when in contact with the brush 21 upon discharge of the condenser 17.

The number 1A in the center of the segment 22 corresponds to an altitude of one foot, 2A to two feet and 10A to ten feet. For indicating the number of feet altitude from ten to one hundred feet in ten feet units apparatus identical to that heretofore described is employed.

When the altitude or depth exceeds ten feet the transmitter 14 and microphone 18 shift from the system for indicating from one to ten feet heretofore described to that for measuring ten to one hundred feet. The shifting from the low range indicator to the high range indicator is accomplished by the discharge of the condenser 17 through a relay 38. The condenser 17 is discharged through the relay 38 by the engagement of a pair of contacts 35. A cam 34 having an elevation on the periphery thereof and fixedly attached to the shaft 4 controls the pair of contacts 35 so that once during each revolution of the shaft 4 the contacts 35 momentarily are closed. The cam 34 is arranged on the shaft 4 to control the contacts 35 so that these contacts engage just prior to the transmission of waves by the transmitter 14 and after the brush 21 has completely swept all of the commutator segments 22 numbered 1A to 10A. Accordingly, if the discharge of the condenser 17 is not impressed across one of the devices 23 through the segments 22 in one complete revolution of the shaft 4, it is discharged through an armature 37 and a break contact 36 of relay 9 and contacts 35 to energize relay 38.

The armature of relay 38 is connected to ground, while the make contact is connected to the armature of a relay 41. The relay 41 has two windings, a small winding 39 and a large winding 40. The passage of current through the small winding 39 is insufficient to actuate the armature of relay 41, but when that armature engages its make contact the energization of winding 39 is sufficient to maintain the engagement of the make contact and armature of relay 41. The break contact of relay 41 is connected to one lead of the winding 40 and one lead of the relay 9. The other lead of the relay 9 is connected to the winding 39 and the make contact of relay 41, while the other lead of the winding 40 is connected to the make contact of a grounded armature 42 associated with the relay 9. Current is supplied to relays 9 and 41 by a source of current 45 grounded at one terminal and connected at the other terminal to the winding 39. The momentary engagement of the armature and make contact of relay 38 causes current to flow from ground, the source 45, the small winding 39, relay 9, the armature and break contact of relay 41, armature and make contact of relay 38 to ground. The momentary operation of relay 38 insures against a short circuit around the winding 40 when the relay 9 operates. The passage of current through the small winding 39 is insufficient to actuate the armature of relay 41. The passage of current through relay 9 causes the engagement of all the armatures and make contacts of that relay including the grounded armature 42 with its make contact. As a result of the engagement of the armature 42 with its make contact, current is supplied from the source 45 through the small winding 39, relay 9 and large winding 40. The energization of large winding 40 causes the locking of the make contact and armature 42 of relay 9 and the actuation and locking of the armature and make contact of relay 41. In operating the relay 41 as above set forth, the relay 38 is momentarily operated by the cam member 34. The momentary operation of the relay 38 completes a circuit from the battery 45 for operating the relay 9. After release of the relay 38 and before release of the relay 9 the coil 40 is energized for operating the relay 41. The releasing of the relay 9 by opening the energizing circuit thereof insures a delay in the release of the relay. This delay in the release of the relay 9 is sufficient to insure the operation of the relay 41. Furthermore, the armature of any relay never opens the contacts controlled thereby until a small interval has elapsed after the energizing circuit has been opened. This applies to the relay 9 in providing delay in the opening of the relay contacts.

The circuit including relays 9, 38 and 41 is such that the first actuation of relay 38 causes relay 9 to be energized and remain energized until another impulse of current passes through relay 38. A second impulse for operating the relay 38 may come from the condenser 17 through the ring 120, brush 121 and segment 124 when the depth is less than 10 feet. Upon passage of the second impulse through relay 38, the relays 9 and 41 are deenergized. Upon passage of the second impulse through the relay 38 a ground is momentarily placed on its contact. This condition causes a short circuit of the winding of relay 9 in series with the winding 40 of relay 41 which causes relay 9 to quickly release. This operation also causes relay 41 to release since its winding 40 is shorted in series with the winding of relay 9. After the second impulse is received the relay 9 remains deenergized until another impulse passes through relay 38 when relay 9 is again actuated and locked. This cycle of operation continues to shift alternately, in response to an impulse through the relay 38, the transmitter, condenser 17 and microphone from one range of distances to that of another.

The engagement of armatures 8 and 31 of relay 9 to their respectively associated make contacts 43 and 44 results in the shifting from one set of illuminating devices 23 with their associated segments, slip rings and brushes to an identical set of illuminating devices 123 with their associated segments, slip rings, brushes and other apparatus capable of indicating the particular distance within another range of distances. A shaft 104 of the apparatus for indicating a second range of distances is driven by the motor 1 through the set of gears 2 and a set of gears 103. The set of gears 103 is such that the shaft 104 revolves at a speed in a manner similar to that of shaft 4 to indicate a particular distance within the second range. For example, the second apparatus may indicate distances from ten to one hundred feet. If the first range indicates from one to ten feet, shaft 4 revolves at ten times the speed of the shaft 104. The make contact 43 is connected to a pair of contacts 106 similar to the contacts 6 to transmit waves once during each revolution of the shaft 104. Contact 44 is connected to slip ring 120 to impress the surge resulting from the discharge of condenser 17 on one of a plurality of segments 122. The plurality of segments 122, a plurality of illuminating devices 123, a slip ring 120, and a brush 132 are identical and perform the same functions respectively as segments 22, illuminating devices 23, slip ring 20 and brush 32. A slip ring 133 is employed which serves the same function as the slip ring 33. A segment 124 is located in the sweep of the brush 121 so that brush 121 makes contact with the segment 124 if the distance is less than the minimum indicated by the devices 123. Segment 124 is connected to relay 38 and when a surge from condenser 17 is impressed on that segment, relay 38 is energized. Accordingly, when the altitude or depth from the system is less than the minimum indicated by the devices 123, relay 38 is actuated. A portion of the slip ring 133 is broken or insulates so that a circuit for the energization of relay 38 is not completed when the brush 132 engages the segment 124.

The energization of relay 38 causes the engagement of its armature and make contact. Since the armature and make contact of relay 41 has been locked with its make contact during the previous energization of relay 38 resulting from the engagement of contacts 35 of the first indicating apparatus, the momentary engagement of the armature and make contact of relay 38 causes the source of current 45 to be effectively removed from relay 9 to disengage its grounded armature 42 and make contact. As a result the two windings 39 and 40 of relay 41 are deenergized to disengage the armature and make contact of that relay with its make contact. The deenergization of relay 9 causes armatures 8, 37 and 31 to engage with their respectively associated break contacts 7, 36 and 30 to shift the system to indicate the low range of altitude or depth by the devices 23. When the depth or altitude exceeds the maximum indicated by the devices 23, the relay 9 is energized to shift the indication to devices 123 in the manner heretofore described.

Fig. 1A shows an indicating board 47 upon which the devices 23 and 123 are mounted. The devices 23 may be arranged in a circular pattern with a number corresponding to the number of feet indicated by each device immediately adjacent to that device. The devices 123 are arranged in a similar manner with a number corresponding to the altitude or depth in feet indicated by each device. In the embodiment illustrated the devices 23 indicate the range from one to ten feet, while devices 123 indicate a range from ten to one hundred feet. Device 23 immediately adjacent to No. 1, Fig. 1A, is illuminated when the surge from condenser 17 is impressed upon segment 22 labeled 1A. In like manner the devices 23 adjacent the numbers 2 to 10 are illuminated when the condenser 17 is discharged through segments 22 marked 2A to 10A, respectively. Devices 123 adjacent to the numerals 10 to 100 are illuminated when the brush 121 is in contact with the segments 122 marked 10B to 100B, respectively, at the moment of the discharge of the condenser 17.

The transmitter 14 and microphone 18 are located at a point the distance from a reflecting surface to which it is desired to be estimated. If the altitude of an airplane above the terrain is required the transmitter and microphone are placed on the underside of the airplane. The transmitter and microphone are located from each other at not greater than twice the minimum distance to be indicated if shielding is not employed. Once during each revolution of the shaft 4 a wave or train of waves is transmitted from the transmitter 14. At the moment of transmission the condenser 17 is charged. The condenser 17 is discharged in response to the reception of the reflected wave or train of waves by the microphone 18. The surge resulting from the discharge of the condenser is impressed upon one of the plurality of segments 22 to discharge the device 23 associated with that segment. Since the brush 21 is rotated at a constant speed the particular device illuminated indicates the time elapsing between the transmission and reception of the reflected wave, or the distance between the transmitter and the reflecting surface. If, for example, the brush 21 is in contact with the segment 22 marked 5A, the device 23 adjacent to the numeral 5 in Fig. 1A is illuminated. If the distance between the transmitter 14 and reflecting surface is greater than ten feet, the condenser 17 is discharged by the engagement of the contacts 35 to energize relay 38. The energization of relay 38 causes the energization of relay 9 to shift the indication from devices 23 to devices 123 and to transmit a wave or train of waves once during each revolution of the shaft 104. A sonic or supersonic wave is then transmitted by the transmitter 14. After reflection on the terrain the wave or train of waves is impressed upon the microphone 18. The discharge of the condenser 17 in response to the reflected waves is impressed upon one of the segments 122. If, for example, the distance of the plane be twenty feet above the terrain, the segment 122 marked 20B is in contact with the brush 121 at the time of discharge of the condenser 17. When the reflected waves are impressed upon the microphone 18, the surge from the condenser 17 illuminates device 123 adjacent to the numeral 20 in Fig. 1A. Device 123 adjacent to the numeral 20 remains illuminated until it is de-ignited by the rotation of the scavenger brush 132. If the plane drops to less than ten feet, for example, eight feet, the condenser 17 is discharged through the segment 124 to energize relay 38. The energization of relay 38 shifts the indication to devices 23. A wave or train of waves is then transmitted once during each revolution of the shaft 4. Upon reception of the reflected wave the condenser 17 is discharged through the device 23 adjacent to the number 8 shown in Fig. 1A. This cycle of operation continues to indicate constantly the altitude of the airplane.

Figures 2, 2A:
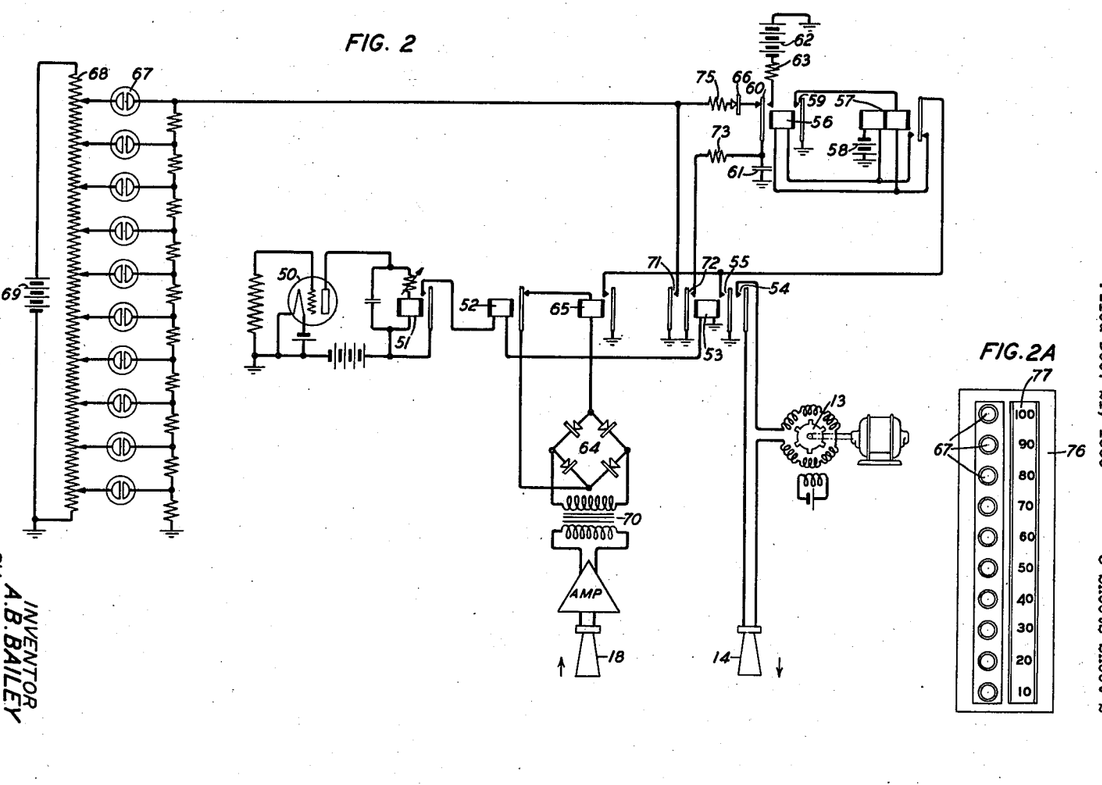

Fig. 2 is a schematic diagram of an altimeter in accordance with this invention in which the altitude above the terrain is ascertained by the illumination of one or more of a plurality of discharge devices. A low frequency oscillator comprising a gaseous space discharge device 50 having a self-biasing resistance to afford sufficient bias to sustain oscillations and a relay 51 in the output energizes the relay 51 at predetermined intervals. In the operation of the oscillator by the gas-filled tube 50 assume that the condenser is discharged and that the tube 50 is not ignited. The condenser being uncharged offers little opposition to the battery potential so that the tube 50 is quickly broken down. Upon breakdown of the tube 50 the condenser is charged and when the charge on the condenser reaches a predetermined point the opposition to battery potential is sufficient to insure the de-igniting of the tube 50. The condenser then discharges through the coil of the relay 51 to effect momentary operation of the relay 51. The above cycle of operations is then repeated. The grid resistance determines the operating points. The engagement of the make contact and armature of relay 51 causes the momentary energization of two relays 52 and 53. The engagement of an armature 54 and a make contact associated with relay 53 produces a wave or train of waves in the transmitter 14 from an inductor-alternator 13. The transmitter 14 and alternator 13 are similar to the transmitter and inductor-alternator shown in Fig. 1. The engagement of another make contact and an armature 55 of relay 53 results in the energization of a relay 56 supplied with current through the small winding of a relay 57 by the source 58. The engagement of an armature and make contact 59 of relay 56 causes the energization of a large winding of the relay 57 to disengage the armature and break contact of that relay. In the operation of the relay 57 as above set forth, the relay 53 is momentarily operated to effect operation of the relay 56. The relay 53 then releases and before release of the armature of the relay 56 takes place, the relay 57 is operated. The operation of the relay 57 locks relays 56 and 57 in operative position. When the energizing circuit of relay 56 is broken by release of relay 53, there will be a small delay before opening of the contacts 59 can take place. This delay is sufficient to insure the operation of the relay 57. The passage of current through the small winding of relay 57 while insufficient to actuate the armature of that relay is capable of maintaining the armature in the energized position. The relay 53 operates only momentarily and opens the contact 55 before the relay 56 is locked. An armature 60 associated with the relay 56 engages a make contact to charge a condenser 61 from a source 62 through a resistance 63. The condenser continues to charge until the relay 56 is deenergized.

A microphone 18 similar to that shown in Fig. 1 is employed for the reception of waves reflected from a terrain which are transmitted by the transmitter 14. The waves are amplified by an amplifier shown in the block diagram in the drawings. The amplified waves pass successively through a transformer 70 and a copper-oxide rectifier bridge 64 and the resulting unidirectional current is employed to energize a relay 65. The energization of relay 65 by the engagement of its armature and make contact results in the deenergization of relay 56 by effectively removing the source 58. The disengagement of armature 59 with its make contact causes the removal of the source of current 58 from both windings of the relay 57. The disengagement of the armature 60 with its make contact removes the source of charging current 62 from the condenser 61 and the engagement of the break contact of armature 60 discharges the condenser through a copper-oxide rectifier 66 and a resistance 75. The surge resulting from the discharge is impressed upon a plurality of gaseous space discharge devices 67 of the neon type. Each of these devices 67 has a different flash-over voltage. To obtain the proper bias for securing the different flash-over voltages for each device a potential divider 68 is bridged across a source of current 69. Each of the devices 67 is connected to different points on the potential divider to provide the required bias. Since the charge on the condenser 61 is dependent upon the time between the transmission of a wave or train of waves from the transmitter 14 and its reception after reflection on the terrain by the microphone 18 and since this time is directly correlated with the distance between the transmitter and the reflecting surface, the devices 67 may be calibrated to indicate any particular distance by means of varying their flash-over voltages with the aid of the potential divider 68.

In order to prevent the direct transmission of a wave or train of waves from the transmitter 14 to the microphone 18 when the transmitter and microphone are in close proximity to each other the circuit between the copper-oxide rectifier bridge 64 and the relay 65 is broken by the operation of relay 52 simultaneously with the transmission of a wave or train of waves by the transmitter 14.

The characteristics of the devices 67 are such that they remain illuminated at a much lower potential than that required to initially ignite them. Accordingly, the devices 67 remain ignited even after the charge on the condenser 61 has leaked off. The operation of relay 53 causes the engagement of an armature 71 and a make contact of that relay to reduce the potential across these devices to substantially zero whereby any device that has been illuminated is de-ignited. The engagement of another armature 72 and a make contact results in the removal of any charge on condenser 61 through a resistance 73 when relay 53 is operated.

The operation of armature 72 of relay 53 and the armature 60 of relay 56 are such that any charge on condenser 61 is removed before the commencement of the charging of condenser 61 from the source 62 and armature 72 has disengaged from its make contact before the armature 60 has engaged its make contact.

In Fig. 2A the devices 67 are shown mounted on a board 76. Alongside the column of devices 67 is a scale 77. On this scale are numerals representing the calibrated distances indicated by each of the lamps.

The transmitter 14 and microphone 18 are located in close proximity to each other on the underside of an airplane. The oscillator comprising the gaseous space discharge device 50 operates the relay 51 at periodic intervals. For example, the oscillation may generate a pulse once per second to ten times per second depending upon the range of distances to be determined. Relay 53 operates to transmit a wave or train of waves from the transmitter 14 and to commence to charge the condenser 61 from the source 62. The reflected wave or waves are impressed upon the microphone 18 to operate relay 65 which deenergizes relay 56. Condenser 61 is discharged through the plurality of discharge devices 67. Since the devices 67 flash over at different voltages some are illuminated, while others are unaffected depending upon the charge accumulated by the condenser 61. Since the magnitude of the charge is directly correlated with the time between transmission of a wave or train of waves and the reception after reflection on the terrain and since this time is dependent upon the distance between the system and the reflecting surface, the number of devices 67 illuminated indicates the distance between the system and the reflecting surface. The devices 67 are preferably arranged in a column with a calibrated scale index 77 arranged alongside the column as shown in Fig. 2A. For example, if the distance between the system and the reflecting surface be fifty feet, the devices 67 immediately adjacent to the numerals 10, 20, 30, 40 and 50 on the plate 72 of Fig. 2A become illuminated. After a predetermined period elapses the relay 51 again becomes energized to transmit another wave or train of waves. Simultaneously with the transmission of the wave or train of waves, any charge on the condenser 61 is removed by the engagement of make contact and armature 72 and the lamps are de-ignited by the engagement of armature 71 with its make contact. Immediately following the removal of any charge on the condenser 61 by the actuation of armature 72, condenser 61 commences to charge. The actuation of the discharge of the condenser by the direct transmission of the wave or train of waves from the transmitter 14 to the microphone 18 is prevented by disconnecting the circuit from the rectifier bridge 64 to relay 65 by the operation of relay 52. The wave or train of waves after reflection on the terrain again discharges the condenser through the plurality of illuminating devices 67. The number of devices illuminated indicates the distance between the system and the reflecting surface. This cycle of operations is continued to render constantly an indication of altitude or depth.

Figures 3, 3A, 3B:
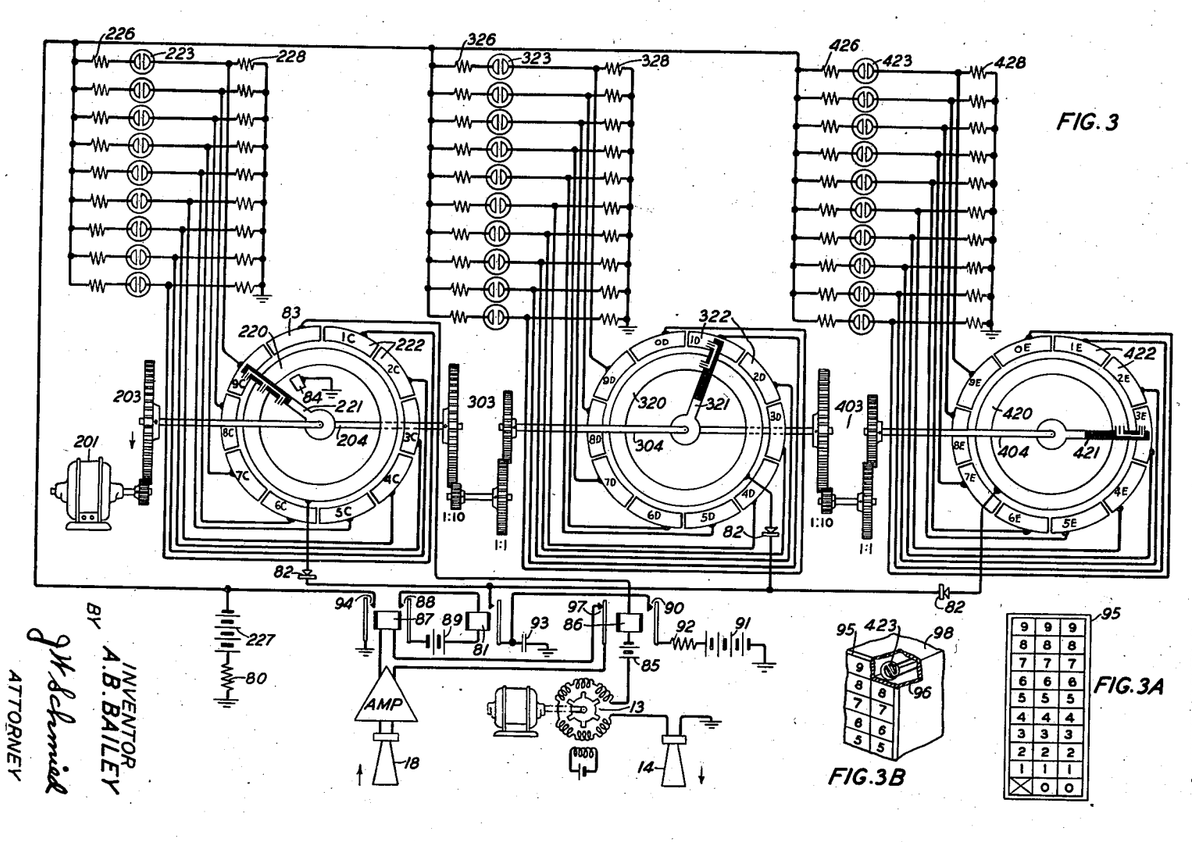
Fig. 3 is a schematic diagram in which the distance is indicated in digits of a particular unit of measurement.
Figs. 3A and 3B illustrate the indicating device used on the system shown in Fig. 3.

Figs. 3, 3A and 3B show a system in which distance is indicated in three digits of a particular unit of measurement. If the unit of measurement be feet, the system shown in Figs. 3, 3A and 3B is capable of measuring the exact altitude or depth in feet from 1 to 1000 feet. A wave or train of waves is transmitted at predetermined intervals. Simultaneously with the transmission of the wave or train of waves a condenser is charged. The condenser is discharged upon the reception of the reflected wave or waves through one of each of three sets of illuminating devices. Each set represents a digit. The particular devices illuminated depend upon the distance between the system and the reflecting surface.

A constant speed motor 201 rotates a shaft 204 by means of a set of gears 203. Fixedly attached to the shaft 204 is a brush 221. A slip ring 220 is constantly in contact with the brush 221 and the brush is in engageable relation with ten commutator segments 222 having equal arcuate lengths so that at all times the brush is in contact with one of the segments or a segment 83. Each of the segments 222 is connected to one electrode of a gaseous discharge illuminating device 223. The other electrode of each device is connected through a limiting resistance 226 to one terminal of a source of current 227. The other terminal of the source 227 is connected to ground through a resistance 80. The electrodes of the devices 223 connected to the segments 222 are also connected to ground through resistances 228. The set of gears 203 are such that the shaft 204 makes one complete revolution in the time required for a wave or train of waves to travel 1000 feet to a reflecting surface and return to the source of transmission. The time, of course, depends upon the particular molecular medium through which the wave or train of waves passes.

Another shaft 304 driven by the shaft 204 through a set of gears 303 rotates one complete revolution in the time required for a wave or train of waves to travel 100 feet to a reflecting surface and return to the source. Another shaft 404 is driven by the shaft 304 through a system of gears 403 so that the shaft 404 rotates one complete revolution in the time required for a wave or train of waves to travel ten feet to a reflecting surface and return to the source. A brush 321 and a brush 421 are fixedly attached to the shafts 304 and 404, respectively. The brush 321 and the brush 421 are in constant contact, respectively, with a slip ring 320 and a slip ring 420. A plurality of commutator segments 322 of equal arcuate length are in engageable relation with the brush 321 so that at all times the brush is in contact with one of the segments. Likewise, the brush 421 is in engageable relation with a plurality of segments 422 of equal arcuate length and arranged so that the brush is in contact at all times with one of the segments. Each of the plurality of commutator segments 322 and 422 is connected to one electrode of a plurality of gaseous space discharge devices 323 and 423, respectively. The other electrodes of devices 323 and 423 are connected to one terminal of the source 227 through resistances 326 and 426, respectively. The electrodes of the devices 323 and 423 connected to the commutator segments are also connected through resistances 328 and 428, respectively, to ground. Each of the slip rings 220, 320 and 420 is connected through a copper-oxide rectifier 82 to the make contact of a relay 81. The devices 223 indicate the depth or altitude in feet in 100 units, the devices 323 in feet in units of ten and devices 423 in single units. The segments 222 are marked 1C to 9C to correspond to an altitude of from 100 to 900 feet, respectively, with which these segments are associated. Likewise segments 323 are indicated 0D to 9D to correspond respectively to altitudes in step of ten feet from 0 to 90 feet and the segments 0E to 9E to correspond respectively from 0 to 9 feet.

The segment 83 and a grounded segment 84 are in engageable relation with the brush 221 at the beginning of rotation of that brush. Both segments 83 and 84 are arranged in relation to the sweep of the brush 221 so that the brush 221 engages these contacts when the slip rings 320 and 420 are engaged, respectively, with segments 322 and 422 connected to devices 323 and 423, respectively, which corresponds to zero indication and the brush 221 is between the segments 222 marked 9C and 1C. The engagement of the segments 83 and 84 by the brush 221 results in the emission of a wave or train of waves by a transmitter 14 by means of the energization of an inductor-alternator 13 through a relay 86 from a source of current 85. The transmitter 14 and the inductor-alternator 13 are similar to those employed in the system shown in Fig. 1. The passage of current through relay 86 results in the engagement of an armature and make contact 90 associated with that relay to charge a condenser 93 from a source 91 through a resistance 92. After the wave or train of waves is reflected upon the terrain, the wave or train of waves is impressed upon a microphone 18. The impressed waves cause a unidirectional current to flow in the output of an amplifier which is connected to the microphone 18. This unidirectional current operates a relay 87 through a break contact and armature 97 of relay 86. The engagement of a make contact and an armature 88 of relay 87 actuates a relay 81 supplied with current by a source 89. One terminal of the condenser 93 is connected to the armature of relay 81. The engagement of the armature and make contact of relay 81 causes the condenser to discharge through the slip rings 220, 320 and 420 and the particular commutator segment upon which the brushes 221, 321 and 421 are engaged at the time of discharge through the particular devices 223, 323 and 423 connected to these engaged segments. The particular devices 223, 323 and 423 remain illuminated until just prior to the next reading. The devices 223, 323 and 423 have similar characteristics to device 23 employed in Fig. 1. Accordingly, once the devices are ignited, they remain illuminated at a lower terminal potential than that required to initially ignite them. However, in response to a reflected wave a grounded armature 94 associated with relay 87 is actuated which momentarily removes the source 227 to de-ignite these devices. The make contact and armature 88 and the relay 81 with its associated make contact and armature are such that the discharge from the condenser 93 is not impressed upon the segments 223, 323 and 423 until the contact and armature 94 have opened. In the above operation a delay is caused in the discharge of the condenser 93 with respect to the closing and opening of the contacts 94 by the build-up time in the energizing circuit of the relay 81 under control of the contact members 88. A further delay in discharging the condenser 93 is provided by the time travel of the armature for the relay 81. The above periods of delay are sufficient to insure that the condenser 93 does not discharge until after the contacts 94 have closed and opened. Accordingly, the previous altitude reading is not removed until just prior to the next reading. To prevent an indication as a result of the direct transmission of waves or trains of waves from the transmitter 14 to the microphone 18 the circuit from the amplifier to the relay 87 is broken at the moment of transmission by the disengagement of the break contact and armature 97 associated with relay 86.

A suitable device for housing the indicating devices 223, 323 and 423 is shown in Figs. 3A and 3B. A board 95 having three sets of digits from 1 to 9 is employed as a panel on a housing 96. Each of the numerals is translucent or transparent, the remainder of the panel 95 being opaque. The illuminating devices 223, 323 and 423 are placed, each set of devices in a single row, in light-proof compartments in the housing 96 immediately behind the numbers and digits to which they correspond.

A wave or train of waves is transmitted by the transmitter 14 as a result of the engagement of the segments 84 and 83 with the brush 221. This engagement occurs once during each revolution of the shaft 204. Simultaneouly, with the transmission of the wave or train of waves the condenser 93 is charged. After reflection on a surface the wave or train of waves is impressed upon the microphone 18 to operate relay 87. The operation of relay 87 in turn actuates relay 81 to discharge the condenser 93 through the slip rings 220, 320 and 420. The discharge is impressed upon the particular segments 222, 322 and 422 with which the brushes 221, 321 and 421 are at the time of discharge, engaged. The surge passes to the particular gaseous discharge devices 223, 323 and 423 to which the particular segments are connected. These particular devices 223, 323 and 423 are ignited. The translucent or transparent numerals on the panel 95 with which these devices are associated become illuminated. The characteristic of the devices 223, 323 and 423 is such that once broken down they remain illuminated at a lower terminal potential than that initially required to ignite them. The potential furnished by the source 227 is sufficient to sustain the illumination of these devices. After the shaft 204 has made one complete revolution another wave or train of waves is transmitted from the transmitter 14 as a result of the engagement of the segments 84 and 83 with the brush 221. The breaking of the circuit between the amplifier and the relay 87 by the break contact and armature 97 at the time of transmission of the wave or train of waves prevents the discharge of the condenser due to the direct reception of the wave or train of waves. Simultaneously with the transmission of the wave or train of waves the condenser 93 is charged. After the wave or train of waves is reflected from a surface it is impressed upon the microphone 18. Relay 87 is, as a result, actuated. Any of the devices 223, 323 and 423 which were ignited as a result of the reception of the previous wave or train of waves are de-ignited by the engagement of the armature and make contact 94 associated with the relay 87. Condenser 93 is discharged through the devices 223, 323 and 423 which are connected to the particular segments 222, 322 and 422, respectively, with which the brushes 221, 321 and 421 are at the time of discharge engaged. The armatures and contacts of relays 87 and 81 are such that the devices previously illuminated are de-ignited immediately prior to the discharge of the condenser 93 through the commutator segments 222, 322 and 422. This cycle of operations is continued to indicate continually the altitude or depth between the system and the reflecting surface.

While these systems have been described for use in the determination of altitude or depth from a point to a reflecting surface, they are equally adapted to ascertain distance between two points. For this purpose, the transmitter 14 is placed at one point and the microphone 18 is located at the other point. Radio or telegraphic communication between the two points affords means for relaying the time of reception of the transmitted sonic or supersonic wave by the microphone 18.

Although the distance determining systems are described for use on airplanes, they are similarly applicable to ships for depth determinations at sea.

While preferred embodiments of this invention have been illustrated and described, various modifications therein may be made without departing from the scope of the appended claims.

What is claimed is:

1. In combination, a source of longitudinal waves, means for transmitting a wave from said source at predetermined intervals, a plurality of gaseous space discharge devices, means responsive to said wave upon receipt after reflection for selectively igniting one of said devices to indicate distance, means controlled by said responsive means for maintaining the selected indication between signals, and means for extinguishing the selected device prior to the next selection of one of said devices.

2. In combination, transmitting means for emitting a wave, control means for operating said transmitting means, a condenser, means operated by said control means for commencing the charging of said condenser to effect a steadily increasing strength of charge on the condenser, means responsive to said wave after passage through a molecular medium to discharge said condenser, and means responsive to the magnitude of the electromotive force produced by the discharge of said condenser to indicate distance.

3. In a system for indicating distance, means for indicating a first range of distance, a second indicating means for indicating a second range of distances, means for normally maintaining said first range indicating means in condition to be responsive to a signal indicating a distance in said first range and said second range indicating means in unresponsive condition, and means responsive to a reflection indicating a certain distance in said second range for rendering responsive said second indicating means.

4. In a system for ascertaining distance, a first indicating means for indicating a first range of distances, a second indicating means for indicating a second range of distances, means responsive to an indication of a certain distance in said second range for rendering responsive said second indicating means and for disabling simultaneously said first indicating means.

5. In a system for indicating distance, a plurality of indicating means for indicating a range of distances, each of said means indicating a different range of distance, and means, responsive to an indication of a distance within one of said ranges, for rendering responsive one of said indicating means and disabling all other indicating means.

6. In a system for the determination of distance, a first indicating means responsive to longitudinal waves for indicating a first range of distances, a second indicating means normally unresponsive to longigtudinal waves for indicating a second range of distances, and switching means, responsive to an indication within said second range, for rendering said second indicating means responsive to longitudinal waves and for disabling said first indicating means.

7. In combination, a first plurality of gaseous space discharge devices for indicating a range of distances, a second plurality of gaseous space discharge devices for indicating a second range of distances, means, responsive to said waves within said first range of distances after passage through a molecular medium, for igniting one of said devices of said first plurality of devices to indicate distance, means, responsive to waves within said second range of distances, for rendering responsive said second plurality of devices and for rendering unresponsive said first plurality of devices to longitudinal waves.

8. A system for the determination of distances, comprising means for transmitting a longitudinal wave, control means for operating said transmitting means at predetermined intervals, a source of current, storing means for storing said current, means responsive to said control means for commencing to store said current by said storing means, receptive means for receiving said wave after passage through a molecular medium, means for preventing the actuation of said receptive means by the direct emission of said longitudinal wave, a plurality of gaseous space discharge devices, each of said devices biased to a different flash-over voltage, a scale associated with said plurality of devices, release means, responsive to the reception of said wave by said receptive means, for releasing stored energy accumulated by said storing means, and means for impressing the released energy on said plurality of devices whereby an indication of distance is obtained by observing the illumination of said devices on said scale.

9. A system for the determination of distance, comprising means for transmitting a longitudinal wave, control means for operating said transmitting means at predetermined intervals, means actuated by said control means for charging a capacitance, a commutator comprising a plurality of segments, gaseous space discharge devices respectively associated with said segments, receptive means for receiving said wave after reflection on a surface, receiving means responsive to the reception of the reflected wave by said receptive means for discharging said condenser, means actuated by said control means for preventing the actuation of said receiving means by the direct emission of said wave, a brush in engageable relation with and rotatable at a constant speed over said plurality of segments for impressing the potential resulting from the discharge of said condenser on one of said devices, and means for deigniting said device prior to the next operation of one of said devices.

10. In a system for indicating distance, transmitting means for emitting a signal wave, control means for operating said transmitting means at predetermined intervals, a plurality of gaseous space discharge devices, a condenser, means responsive to said control means for charging said condenser, means responsive to a reflected signal wave for discharging said condenser, means for selectively igniting at least one of said devices by the discharge from said condenser and means for extinguishing any selected device prior to the next selective operation.

11. In a system for indicating distance, transmitting means for emitting signal waves, control means for operating said transmitting means at predetermined intervals, a plurality of gaseous space discharge devices, a capacitance, means responsive to said control means for commencing the charging of said capacitance to effect a steadily increasing strength of charge on the capacitance, means responsive to reflected signal waves for discharging said capacitance, means for igniting said devices in number according to the magnitude of the electromotive force produced by the discharge of said capacitance to indicate distance, means for maintaining the selected indication between signals and means for extinguishing any selected device prior to the next selection of any of said devices.

12. In a system for indicating distance, transmitting means for emitting signal waves, control means for operating said transmitting means at predetermined intervals, a plurality of gaseous space discharge devices, means responsive to a reflected signal wave for igniting at least one of said plurality of devices to indicate distance, means for maintaining said device ignited between signals, and means governed by said control means for extinguishing any selected device prior to the next distance indication.

13. In a system for determination of distance, transmitting means for emitting signal waves, control means for operating said transmitting means at predetermined intervals, a plurality of gaseous space discharge devices, a capacitance, means responsive to said control means for charging said capacitance, means responsive to reflected signal waves for discharging said capacitance, means for igniting at least one of said plurality of devices by the discharge from said capacitance to indicate distance, means controlled by said means responsive to the reflected wave for maintaining the selected indication between signals, and means controlled by the reflected signal waves for extinguishing any selected device an interval before the next distance indication.

14. In a system for indicating distance, transmitting means for emitting a signal wave, control means for operating said transmitting means, a plurality of gaseous space discharge devices, a condenser, means responsive to said control means for charging said condenser, receiving means responsive to a reflected signal wave for discharging said condenser, auxiliary means for igniting at least one of said plurality of devices by the discharge from said condenser to indicate distance, and means governed by said auxiliary means for extinguishing said device prior to the next distance indication.

15. In combination, a capacitance, transmitting means for emitting a longitudinal wave, control means for operating said transmitting means at predetermined intervals, means operated by said control means for charging said capacitance, means responsive to said wave for discharging said capacitance, a plurality of gaseous space discharge devices, means responsive to the discharge of said capacitance for selectively igniting at least one of said devices to indicate distance, means for maintaining the selected indication between signals and means for extinguishing any selected device prior to the next selective operation.

ARNOLD B. BAILEY.